(12) United States Patent
Nastasi, Jr.

(10) Patent No.: US 7,021,157 B2
(45) Date of Patent: Apr. 4, 2006

(54) SYSTEM AND METHOD FOR TESTING A CLAMPING FORCE

(75) Inventor: John D. Nastasi, Jr., Warren, OH (US)

(73) Assignee: Electronic Data Systems Corporation, Plano, TX (US)

( * ) Notice: Subject to any disclaimer, the term of this patent is extended or adjusted under 35 U.S.C. 154(b) by 106 days.

(21) Appl. No.: 10/778,312

(22) Filed: Feb. 12, 2004

(65) Prior Publication Data

US 2005/0178212 A1    Aug. 18, 2005

(51) Int. Cl.
    G01N 3/02    (2006.01)
(52) U.S. Cl. ....................................................... 73/856
(58) Field of Classification Search ................. 73/856, 73/866, 860
    See application file for complete search history.

(56) References Cited

U.S. PATENT DOCUMENTS

| | | | |
|---|---|---|---|
| 3,871,208 A | 3/1975 | Berg | 73/12 |
| 4,090,405 A * | 5/1978 | McKee | 73/152.61 |
| 4,435,975 A * | 3/1984 | Edward, Jr. | 73/81 |
| 4,478,092 A | 10/1984 | Oren, III | 73/862.55 |
| 4,999,475 A | 3/1991 | Yasuge | 219/86.41 |
| 5,563,392 A | 10/1996 | Brown et al. | 235/91 R |
| 5,608,173 A | 3/1997 | Brendel | 73/862.628 |
| 5,659,935 A * | 8/1997 | Lo-Pinto et al. | 29/33 T |
| 5,968,376 A | 10/1999 | Shirk | 219/109 |
| 6,084,195 A | 7/2000 | Swaggerty et al. | 219/86.41 |
| 6,184,487 B1 | 2/2001 | Visscher | 219/91.1 |
| 6,356,808 B1 | 3/2002 | Stenberg | 700/254 |
| 2002/0083751 A1* | 7/2002 | Heffron et al. | 72/110 |
| 2003/0015501 A1 | 1/2003 | Nastasi, Jr. | 219/109 |
| 2004/0108122 A1* | 6/2004 | Berger et al. | 173/132 |

FOREIGN PATENT DOCUMENTS

| | | |
|---|---|---|
| DE | G 9205165.0 | 6/1992 |
| DE | 19754857 A1 | 12/1997 |
| WO | WO 03/008147 A1 | 1/2003 |

OTHER PUBLICATIONS

V3300 Electrode Condition Sensor, Installation and Maintenance Manual, Part No. 97164B, REV.0, 13 pages, 1995.
PCT, Notification of Transmittal of the International Search Report or the Declaration, 8.pages, Oct. 23, 2002.

(Continued)

Primary Examiner—Max Noori
(74) Attorney, Agent, or Firm—Baker Botts L.L.P.

(57) ABSTRACT

A system for testing a clamping force includes a lever, a base, and a sensor, The lever is coupled to a pivot and moves about the pivot. The lever includes a first end and a second end on opposites sides of the pivot. The base receives a first tip of a clamp and maintains a fixed position relative to the pivot. The second end of the lever receive a second tip of the clamp and moves relative to the base and the pivot as the first tip and the second tip of the clamp move towards one another. The sensor measures a first force applied by the first end of the lever. The first force is proportional to a second force applied to the second end of the lever by the clamp.

20 Claims, 4 Drawing Sheets

OTHER PUBLICATIONS

Nastasi, Jr., "Method and System for Weld Process Monitoring." U.S. Appl. No. 10/316,971, filed Dec. 11, 2002, 32 pages (including drawings).

PCT, Notification of Transmittal of the International Search Report or the Declaration, PCT/US03/38387, 7 pages, May 3, 2004.

PCT, "Notification of Transmittal of the International Search Report and the Written Opinion of the International Searching Authority, or the Declaration," PCT/US2005/003932, 13 Pages, May 31, 2005.

* cited by examiner

SYSTEM AND METHOD FOR TESTING A CLAMPING FORCE

CROSS-REFERENCE TO RELATED APPLICATIONS

This application is related to U.S. application Ser. No. 10/316,971, filed Dec. 11, 2002, entitled, "Method and System for Weld Process Monitoring," now pending, and is also related to U.S. application Ser. No. 09/910,394, filed Jul. 20, 2001, entitled, "Method and System for Weld Process Monitoring," currently allowed, both applications by John D. Nastasi, Jr.

TECHNICAL FIELD OF THE INVENTION

This invention relates generally to the field of process monitoring and, more specifically, to a system and method for testing a clamping force.

BACKGROUND OF THE INVENTION

As computers have grown increasingly important in today's society, various industries have increasingly adopted computer controlled systems for more efficient and effective control and monitoring of equipment. Industries using automatic welding have increasingly used computer controlled equipment.

Industries involved with automatic welding have turned to computer controlled machinery to increase the efficiency of assembly lines. One common operation on an assembly line is the welding together of components. The welding operation is often performed automatically by a computer-controlled welding device. Often, a determination of proper operation of the welding device is performed manually by inspecting welds after they are performed. For example, a pry test may be used to determine a bad weld that has not properly joined two elements. However, manual inspection can be undesirable as many bad welds can be created before a problem is detected.

SUMMARY OF THE INVENTION

In accordance with the present invention, a system and method testing a clamping force is provided that substantially eliminates or reduces disadvantages or problems associated with previously developed systems and methods.

In one embodiment, a system for testing a clamping force includes a lever, a base, and a sensor, The lever is coupled to a pivot and moves about the pivot. The lever includes a first end and a second end on opposites sides of the pivot. The base receives a first tip of a clamp and maintains a fixed position relative to the pivot. The second end of the lever receive a second tip of the clamp and moves relative to the base and the pivot as the first tip and the second tip of the clamp move towards one another. The sensor measures a first force applied by the first end of the lever. The first force is proportional to a second force applied to the second end of the lever by the clamp.

The present invention provides a number of important technical advantages. Unlike previous techniques, the present invention provides a more accurate and more flexible way of measuring clamping force. These measurements can be used to detect existing or potential problems with manufacturing equipment. Early and accurate detection of these problems allows operators to quickly correct the problems, which increases the productivity of manufacturing operations and improves the overall quality of the manufactured goods. For these and other readily apparent reasons, the present invention represents a significant advance over prior art systems and methods. Various embodiments of the present invention may provide all, some, or none of these advantages.

DETAILED DESCRIPTION OF THE DRAWINGS

Figure 1:
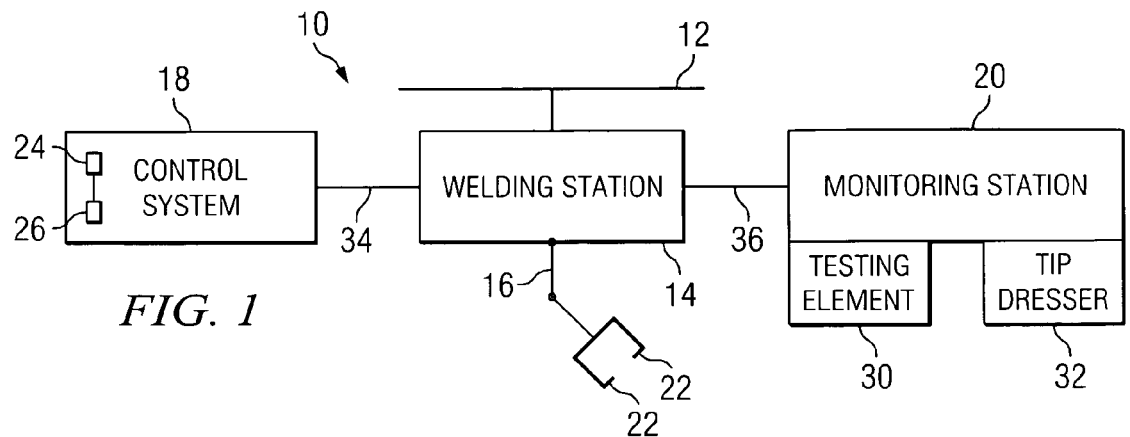
FIG. 1 is a block diagram illustrating a weld process monitoring system according to one embodiment of the present invention.

FIG. 1 is a block diagram illustrating a weld process monitoring system 10. System 10 includes an assembly line 12, a welding station 14, a weld arm 16, a control system 18, and a monitoring station 20.

Assembly line 12 moves physical items so that welding station 14 may access the items. In a particular embodiment, assembly line 12 may move physical items to a predetermined position such that welding station 14 is given suitable time to perform one or more welds on the items. In an alternative embodiment, assembly line 12 may move physical items along a predetermined path such that welding station 14 may perform one or more welds on the items as they move along the path.

Welding station 14 performs automated, manual and/or partially manually controlled welding on items on assembly line 12. More specifically, welding station 14 may provide mechanical and/or logical control of welding arm 16 for welding products on assembly line 12.

Welding arm 16 is an articulated or non-articulated arm that includes weld tips 22 for welding items on assembly line 12. Welding arm 16 may include any suitable number of weld tips 22. Welding arm 16 moves weld tips 22 to assembly line 12 to perform a weld. In a particular embodiment, welding arm 16 may bend at a joint, rotate about an axis, or otherwise move in a suitable manner to appropriately position weld tips 22. Weld arm 16 moves weld tips 22 to position material to be welded between tips 22 and moves tips 22 towards one another to clamp the material between tips 22. Weld arm 16 welds the material between tips 22 and then moves weld tips away from one on another to unclamp the material between tips 22. In a particular embodiment, weld tips 22 are made, in whole or in part, of copper, and tips 22 perform resistive welding and may be water cooled or air cooled. The invention is not limited to any specific number of weld tips 22, any particular material for fabrication weld tips 22, or any kind of cooling mechanism.

Control system 18 includes a processor 24 and storage 26. Processor 24 may be any device or combination of devices capable of processing information. Processor 24 may be located local to welding station 14 and monitoring station 20, or processor 24 may be located remote from welding station 14 and monitoring station 20. Processor 24 may be a combination of hardware and software or may exist entirely in hardware. In a particular embodiment, processor 24 may be an application specific integrated circuit (ASIC), a field programmable gate array (FPGA), a general purpose central processing unit (CPU) or other suitable hardware device.

Storage 26 may be any device or combination of devices capable of storing information. For example, in particular embodiment, storage 26 may include a hard drive, random access memory (RAM), dynamic random access memory (DRAM), or any other suitable device for storing data using physical, optical, electronic or any other technology.

Control system 18 assists welding station 14 in the operation and control of weld arm 16 and weld tips 22. Control system 18 also receives information from monitoring station 20 and welding station 14 for storage and analysis. For example, in a particular embodiment, control system 18 may receive errors or other data generated at welding station 14 or monitoring station 20 for recording in a log on storage 26. Multiple control systems 18 may be used for different operations without departing from the scope of the invention. For example, in a particular embodiment, separate control systems 18 may be used to control welding station 14 and to receive and analyze information from monitoring station 20.

Monitoring station 20 monitors the operation of weld tips 22. Monitoring station 20 includes a testing element 30 and a tip dresser 32. Testing element 30 performs one or more tests on weld tips 22. For example, testing element 30 may determine weld tip cooling status, weld tip alignment, the clamping force of weld tips 22, a pneumatic component status associated with arm 16, and force settings associated with welding station 14. Testing element 30 may perform only one or any combination of these tests without departing from the scope of the invention. Testing element 30 is described in greater detail in association with FIGS. 2–5. Tip dresser 32 repairs weld tips 22. More specifically, as weld tips 22 are used to weld products on assembly line 12, weld tips 22 may become dull. Tip dresser 32 sharpens weld tips 22.

In the particular embodiment illustrated in FIG. 1, welding station 14 is coupled to control system 18 by link 34 and coupled to monitoring station 20 by link 36. In alternative embodiments, welding station 14, control system 18, and monitoring station 20 may use wire-line links, wireless links, or any other suitable links to communicate with one another. In a particular embodiment, control-system 18 may use wireless links to communicate with welding station 14 and monitoring station 20, and welding station 14 and monitoring station may not communicate information to one another.

In operation, assembly line 12 moves items to welding station 14 where they are welded. Welding station 14 uses weld arm 16 to weld portions of items on assembly line 12. In a particular embodiment, weld arm 16 moves weld tips 22 to a specific location on an item and moves weld tips 22 together to clamp that location on the item, and weld tips 22 use resistive welding to generate a weld at that location.

At appropriate intervals, welding station 14 moves weld tips 22 to monitoring station 20 for testing and/or repair. In a particular embodiment, welding station 14 may move weld tips 22 to monitoring station 20 after performing a predetermined number of welds, after operating on a specific number of items on assembly line 12, or after an elapsed period of time. In an alternative embodiment, welding station 14 may be prompted either manually or by control system 18 to move weld tips to monitoring station 20 for testing or repair.

At monitoring station 20, testing element 30 performs one or more tests on weld tips 22, and tip dresser 32 repairs weld tips 22. Monitoring stations 20 may determine one or more items of information about weld tips 22. For example, in a particular embodiment, monitoring station 20 may determine weld tip cooling status, weld tip alignment status, weld tip clamping force status, pneumatic component status, welding force setting status, tip dressing force status, weld tip attitude with respect to tip dresser 32, tip dresser force capability status, air-binary-regulator status with respect to regulation of weld tip force, tip dresser dwell time, tip dresser blade status, whether the weld arms are bent and whether a monitoring operation has been missed. Welding station 14 then returns weld arm 16 and weld tips 22 to welding items on assembly line 12.

Figure 2A:
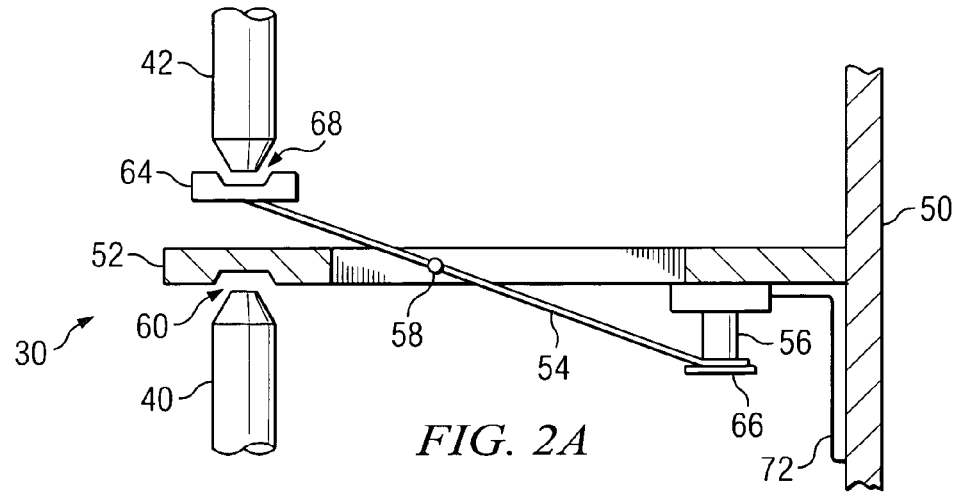
FIGS. 2A and 2B are side views of a testing element according to one embodiment of the present invention.
Figure 2B:
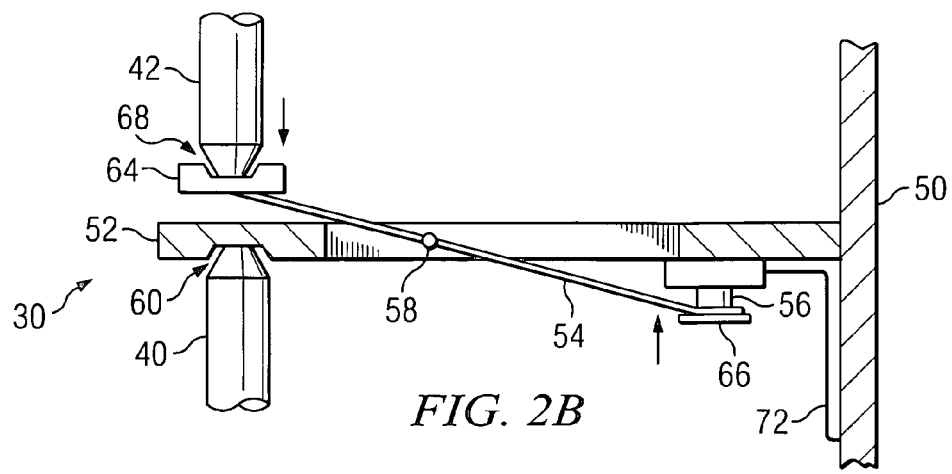
Figure 3A:
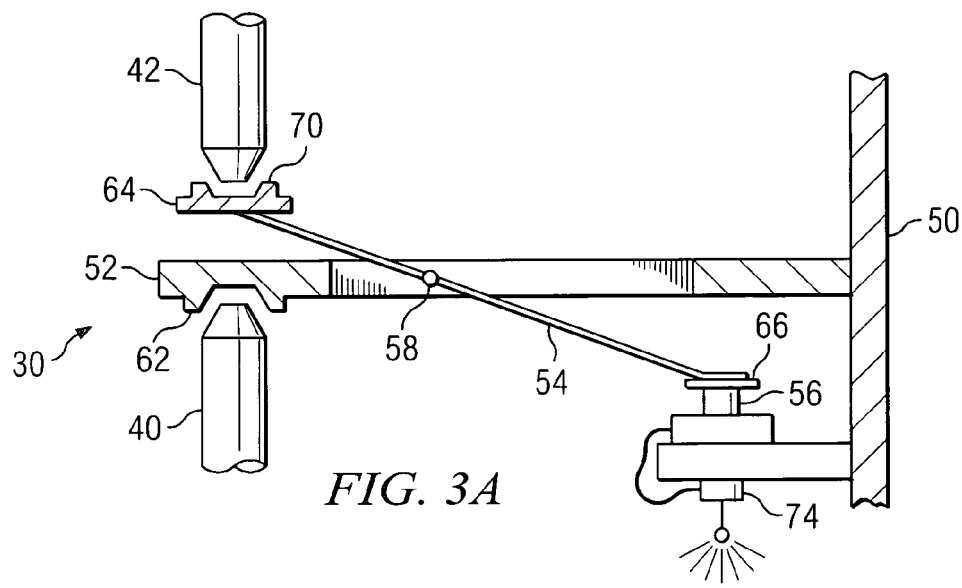
FIGS. 3A and 3B are side views of the testing element according to another embodiment of the present invention.
Figure 3B:
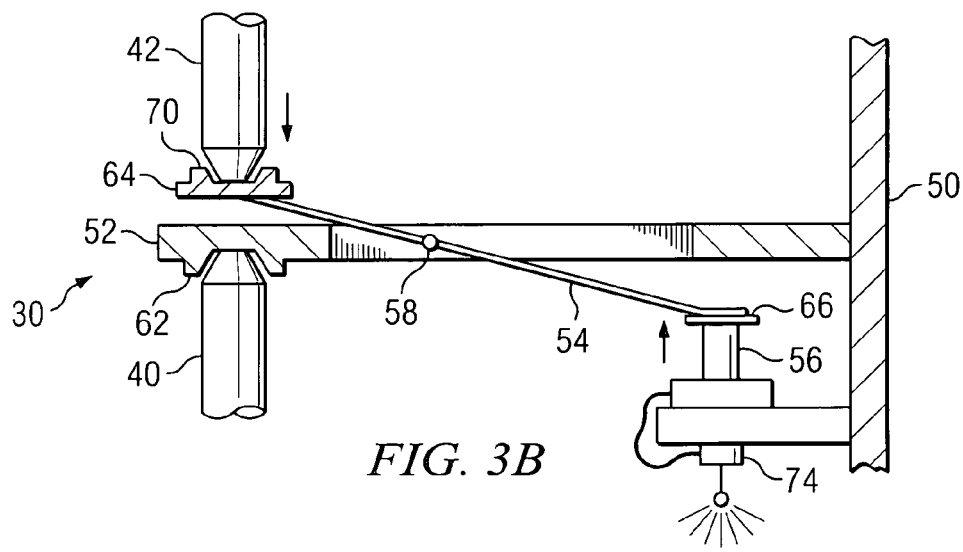
Figure 4:
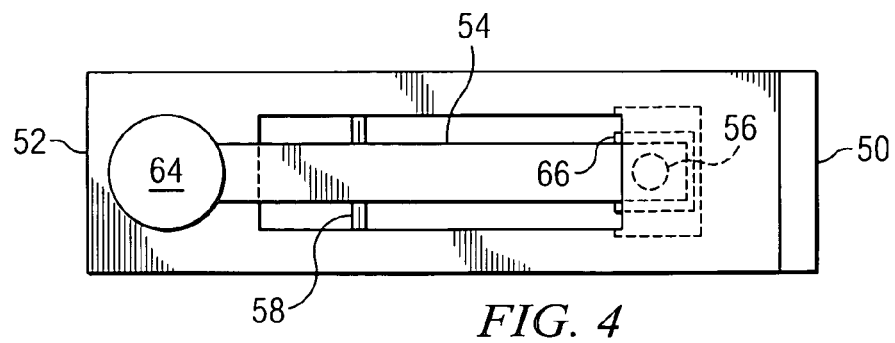
FIG. 4 is a top view of the testing element according to one embodiment of the present invention.

FIGS. 2A, 2B, 3A, and 3B are side views illustrating two different embodiments of testing element 30, and FIG. 4 is a top view of an embodiment of testing element 30. These figures are discussed together for increased clarity. Testing element 30 includes a mounting 50, a base 52, a lever 54, and a sensor 56.

Mounting 50 provides a substantially stable attachment to monitoring station 20 such that testing element 30 is securely attached to monitoring station 20. Mounting 50 may be made of any suitable materials and may be of any suitable shape. In a particular embodiment, mounting 50 may include a housing which partially encloses base 52, lever 54, and sensor 56. The housing may protect base 52, lever 54, and sensor 56 from debris (such as weld slag from weld tips 40 and 42) which could interfere with their operation.

Base 52 receives weld tip 40 and maintains a fixed position relative to a pivot 58 of lever 54. In the illustrated embodiment, base 52 is connected to pivot 58 and mounting 50. In alternative embodiments, base 52 and pivot 58 may be separately connected to mounting 50, or base 52 and pivot 58 may be separately connected to the ground or some other fixed point. In an alternative embodiment, base 52 and pivot 58 maintain a fixed position relative to one another, but base 52 and pivot 58 may move together relative to the ground or some other fixed position.

In a particular embodiment, a portion of base 52 may be shaped so as to receive weld tip 40 at a particular location. As illustrated in FIGS. 2A and 2B, base 52 may include a recessed portion 60 that receives weld tip 40, or alternatively, as illustrated in FIGS. 3A and 3B, base 52 may include raised structures 62 that receive weld tip 40. In other embodiments, base 52 may not include any physical formations that indicate a particular location where base 52 receives weld tip 40.

Lever 54 is coupled to pivot 58 and moves about pivot 58. One end 64 of lever 54 interacts with weld tip 42, and the other end 66 of lever 54 interacts with sensor 56. Lever 54 may be of any suitable shape or length. As discussed in further detail below with reference to FIGS. 5A, 5B, and 5C, pivot 58 may be located at any suitable location along the length of lever 54 between ends 64 and 66.

End 64 interacts with weld tip 42. In a particular embodiment, end 64 may be shaped so as to receive weld tip 42 at a particular location. As illustrated in FIGS. 2A and 2B, end 64 may include a recessed portion 68 that receives weld tip 42, or alternatively, as illustrated in FIGS. 3A and 3B, end 64 may include raised structures 70 that receive weld tip 42. In other embodiments, end 64 may include a combination of recessed portion 68 and raised structure 70 or, alternatively, may include no physical formations that indicate a particular location where end 64 receives weld tip 42. In the particular embodiment illustrated in FIGS. 2A, 2B, 3A and 3B, end 64 is separated from base 52. In alternative embodiments, the space between end 64 and base 52 may include material that can be compressed as end 64 moves towards base 52.

End 66 of lever 54 interacts with sensor 56. In the particular embodiment illustrated in FIGS. 2A and 2B, end 66 pushes against sensor 56 as lever 54 is forced to move in a counter-clockwise direction around pivot 58. In such an embodiment, end 66 may be directly coupled to sensor 56 or may be coupled to sensor 56 by one or more intermediate structures. Alternatively, end 66 may push against sensor 56, either directly or through one or more intermediate structures, without being coupled to sensor 56.

In the particular embodiment illustrated in FIGS. 3A and 3B, end 66 pulls away from sensor 56 as lever 54 is forced to move in a counter-clockwise direction around pivot 58. In such an embodiment, end 66 may be directly coupled to sensor 56 or may be coupled to sensor 56 by one or more intermediate structures.

Sensor 56 measures a force applied by end 66 of lever 54. In the particular embodiment illustrated in FIGS. 2A and 2B, sensor 56 is a load cell or any other suitable device that may measure the force of end 66 of lever 54 pushing against sensor 56. In the particular embodiment illustrated in FIGS. 3A and 3B, sensor 56 is a strain gauge or other suitable device that may measure the force of end 66 of lever 54 pulling away from sensor 56.

Sensor 56 also communicates measurement information to processor 24 of control system 18 for analysis. In the particular embodiment illustrated in FIGS. 2A and 2B, sensor 56 communicates the measurement information using a wire-line link 72. In the particular embodiment illustrated in FIGS. 3A and 3B, sensor 56 communicates the measurement information using a wireless link 74. In alternative embodiments, sensor 56 may use any suitable combination of wire-line links, wireless links, or any other suitable technology for communicating measurement information.

In operation, when tips 40 and 42 are not interacting with base 52 and end 64, lever 54 is in a default position, as shown in FIGS. 2A and 3A. In a particular embodiment, lever 54 may include a spring that returns lever 54 to the default position when weld tips 40 and 42 are not interacting with base 52 and end 64. For example, the spring may be included in pivot 58 or between lever 54 and some other structure such as base 52. In an alternative embodiment, sensor 56 may force lever 54 to the default position when weld tips 40 and 42 are not interacting with base 52 and end 64.

As weld tips 40 and 42 move towards one another (or clamp together), they move end 64 and base 52 towards one another, which causes lever 64 to move about pivot 58 in a counter-clockwise direction (as viewed from the perspective of FIGS. 2A, 2B, 3A, and 3B). End 66 of lever 54 applies a force to sensor 56 that is proportional to the force that weld tip 42 applies to end 64 of lever 54. Sensor 56 measures the amount force that end 66 of lever 54 applies to sensor 56, and sensor 56 communicates the measurement information to processor 24 using wire-line link 72, wireless link 74, or any other suitable communication technology.

In the particular embodiment of FIGS. 2A and 2B, sensor 56 is a load cell or other device that measures the amount of force with which end 66 pushes against sensor 56. As end 64 of lever 54 moves from the default position shown in FIG. 2A towards base 52, end 66 of lever 54 compresses sensor 56 as shown in FIG. 2B. Sensor 56 measure the force applied by end 66 of lever 54.

In the particular embodiment of FIGS. 3A and 3B, sensor 56 is a strain gauge or other device that measure the amount of force with which end 66 pulls away from sensor 56. As end 64 of lever 54 moves from the default position shown in FIG. 3A towards base 52, end 66 of lever 54 extends sensor 56 as shown in FIG. 3B. Sensor 56 measure the force applied by end 66 of lever 54.

In a particular embodiment, the force that end 66 of lever 54 applies to sensor 56 is substantially equivalent to the force that weld tip 42 applies to end 64 of lever 54. In such an embodiment, the force measurement made by sensor 56 is representative of the force applied between weld tips 40 and 42.

In an alternative embodiment, the force that end 66 of lever 54 applies to sensor 56 is proportional to the force that weld tip 42 applies to end 64 of lever 54. In such an embodiment, sensor 56 may communicate the force measurement to processor 24 of control system 18, and processor 24 receives the measurement and calculates from that measurement the force that weld tip 42 applies to end 64 of lever 54. For example, in a particular embodiment, the force that end 66 of lever 54 applies to sensor 56 may be larger than the force that weld tip 42 applies to end 64 by a known factor, and processor 24 may divide the force measurement received from sensor 56 by that factor to calculate the force that weld tip 42 applies to end 64 of lever 54. In an alternative embodiment, the force that end 66 of lever 54 applies to sensor 56 may be smaller than the force that weld tip 42 applies to end 64 by a known factor, and processor 24 may multiply the force measurement received from sensor 56 by that factor to calculate the force that weld tip 42 applies to end 64 of lever 54

Instead of closing weld tips 40 and 42 directly on sensor 56, testing element 30 uses lever 54 to remove some side force from the measurement. As a result, lever 54 allows testing element 30 to obtain a more accurate measurement of the clamping force of weld tips 40 and 42.

Figure 5A:
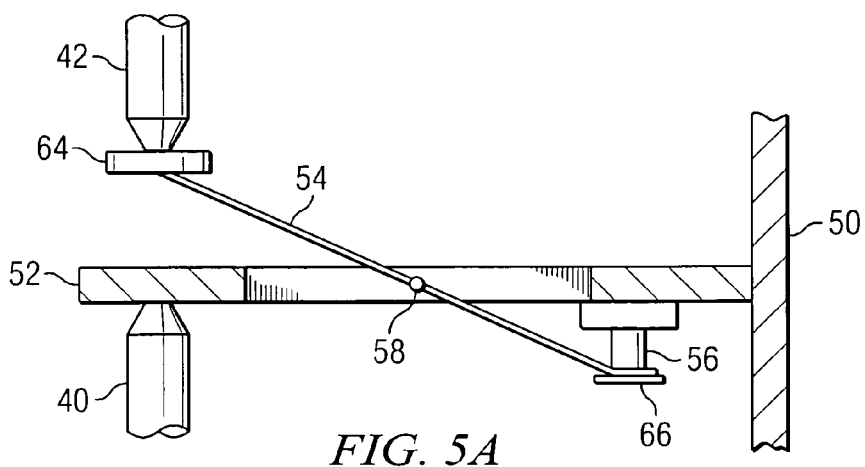
FIGS. 5A, 5B, and 5C are side views of the testing element showing various embodiments of the present invention.
Figure 5B:
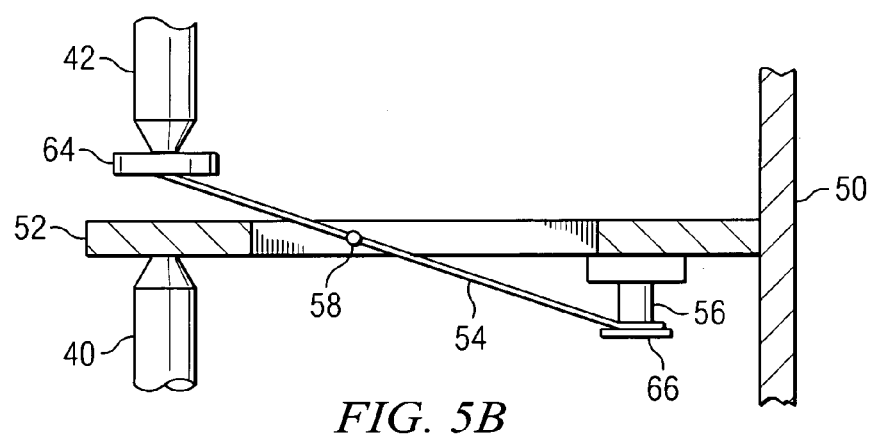
Figure 5C:
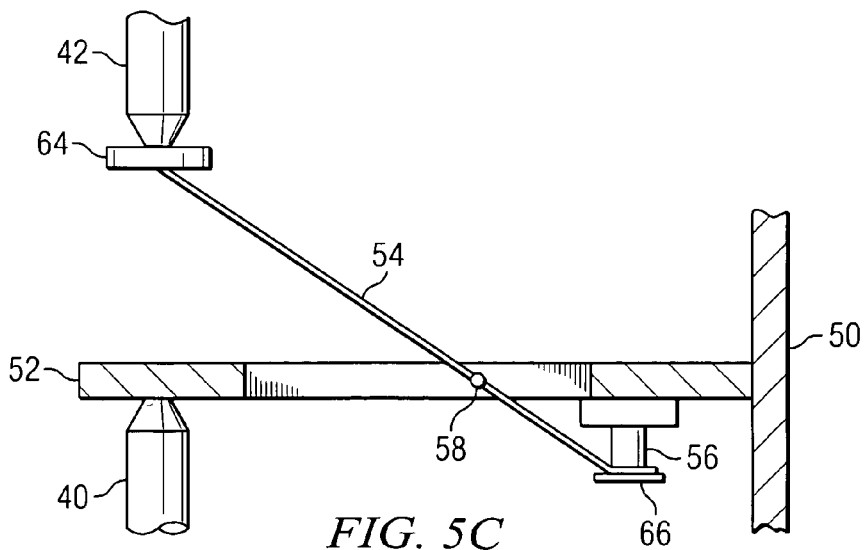

FIGS. 5A, 5B, and 5C illustrate a side view of three embodiments of testing element 30 in which pivot 58 is located in different locations along lever 54.

In FIG. 5A, pivot 58 is located substantially in the midpoint of lever 54. In this particular embodiment, the force that end 66 of lever 54 applies to sensor 56 is substantially equivalent to the force that weld tip 42 applies to end 64 of lever 54.

In FIG. 5B, pivot 58 is located closer to end 64 of lever 54 than to end 66. In this particular embodiment, the force that end 66 of lever 54 applies to sensor 56 is less than the force that weld tip 42 applies to end 64 of lever 54. In such an embodiment, processor 24 may multiply the measurement received from sensor 56 by a suitable factor to calculate the force that weld tip 42 applies to end 64 of lever 54.

In FIG. 5C, pivot 58 is located close to end 66 of lever 54 than to end 64. In this particular embodiment, the force that end 66 of lever 54 applies to sensor 56 is greater than the force that weld tip 42 applies to end 64 of lever 54. In such an embodiment, processor 24 may divide the measurement received from sensor 56 by a suitable factor to calculate the force that weld tip 42 applies to end 64 of lever 54.

Figure 6:
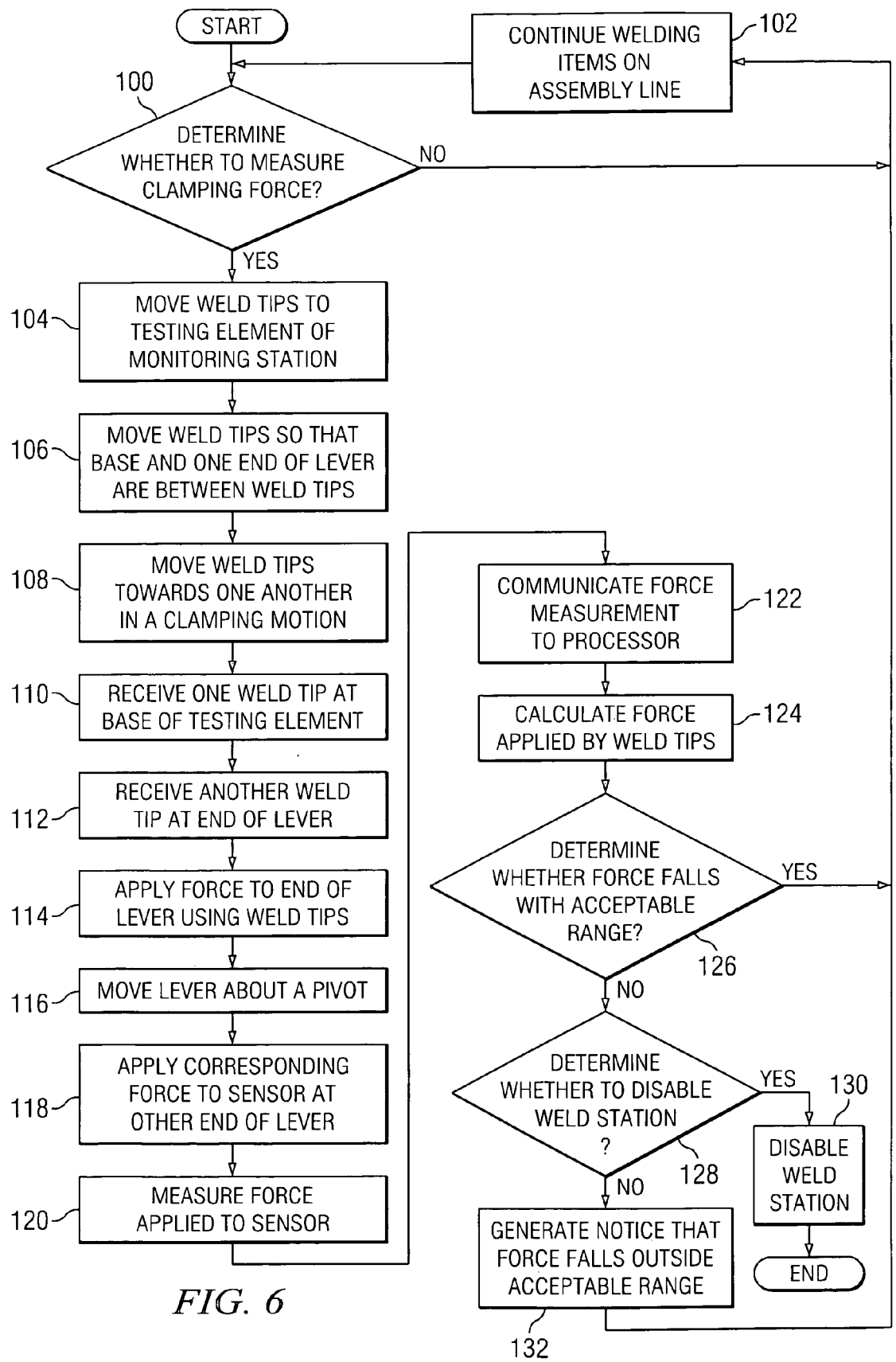
FIG. 6 is a flow chart of an exemplary method of measuring clamping force according to one embodiment of the present invention.

FIG. 6 illustrates a flow chart of a method of measuring clamping force. The method begins at step 100 where control system 18 determines whether to measure the clamping force of tips 40 and 42 at weld station 14. In a particular embodiment, control system 18 may decide to measure the clamping force of weld tips 40 and 42 after weld station 14 uses weld tips 40 and 42 to perform a predetermined number of welds. In an alternative embodiment, control system 18 may decide to measure the clamping force of weld tips 40 and 42 after a particular period of time. Alternatively, a user may manually instruct control system 18 to measure the clamping force of weld tips 40 and 42. If control system 18 decides not to measure the clamping force of weld tips 40 and 42 at step 100, welding station 14 continues to weld items on assembly line 12 at step 102 until control system 18 determines to measure the clamping force of weld tips 40 and 42 at step 100.

Once control system 18 decides to measure the clamping force of weld tips 40 and 42 at step 100, weld station 14 moves weld tips 40 and 42 to testing element 30 of monitoring station 20 at step 104. In a particular embodiment, weld station 14 uses weld arm 16 to move weld tips 40 and 42. At step 106, weld station 14 moves weld tips 40 and 42 so that base 52 and end 64 of lever 54 at testing element 30 are located between weld tips 40 and 42. At step 108 weld station 14 moves weld tips 40 and 42 towards one another in a clamping motion. Base 52 of testing element 30 receives weld tip 40 at step 110, and end 64 of lever 54 receives weld tip 42 at step 112. Weld tips 40 and 42 apply a force to end 64 of lever 54 at step 114 and move lever 54 about pivot 58 at step 116. End 66 of lever 54 applies as corresponding force to sensor 56 at step 118.

Sensor 56 measures the force applied by end 66 of lever 54. In a particular embodiment, sensor 56 is a load cell or other device that measures the force of end 66 pushing against sensor 56. In an alternative embodiment, sensor 56 is a strain gauge or other device that measures the force of end 66 pulling away from sensor 56. Sensor 56 communicates the force measurement to processor 24 of control system 18. Sensor 56 may communicate the measurement information using a wire-line link, a wireless link, or any other suitable communication technology.

Processor 24 calculates the force applied by weld tips 40 and 42 at step 124. In a particular embodiment, pivot 58 is located closer to end 66 of lever 54 than end 64, and as a result, the force measured by sensor 56 is greater than the force weld tip 42 applied to end 64 by a known factor. In such an embodiment, processor 24 divides the measured force by the known factor. In an alternative embodiment, pivot 58 is closer to end 64 of lever 54 than end 66, and as a result, the force measured by sensor 56 at end 66 is less than the force applied by end 42 to end 64 by a known factor. In such an embodiment, processor 34 multiplies the measured force by the known factor to calculate the force applied by weld tip 42. In an alternative embodiment, the force applied by end 66 to sensor 56 is substantially equivalent to the force applied by weld tip 42 to end 64, and as a result, the measured force is substantially equivalent to the force that weld tip 42 applies to end 64, without requiring processor 24 to perform any calculations.

At step 126, processor 24 determines whether the force applied by weld tip 42 falls within an acceptable range. In a particular embodiment, a user may input in control system 18 an acceptable range of clamping force for weld tips 40 and 42. For example, clamping force is a key parameter in the resistance spot welding process. Too high of force cause cold, small, or distorted welds, and too low of force causes holes burned through the metal and rapid flattening of weld tips 40 and 42. If processor 24 determines that the force falls within an acceptable range at step 126, control system 18 instructs welding station 14 to continue welding items on assembly line 12 at step 102.

If processor 24 determines that the force does not fall within an acceptable range at step 126, processor 24 next determines whether to disable welding station 14 at step 128. If processor 24 decides to disable weld station 14, control system 18 disables weld station 14 at step 130. If processor 24 decides not to disable weld station 14, processor 24 may generate a notice that the clamping force of weld tips 40 and 42 falls outside the acceptable range at step 132, and the method then returns to step 102, where control system 18 instructs welding station 14 to continue welding items on assembly line 12. In a particular embodiment, the measured clamping force may not be so far outside the acceptable range as to warrant disabling weld station 14. In such a situation, the clamping force may merely indicate that welding station 14 needs maintenance. Control system 18 may generate an e-mail or other notice to schedule maintenance or other corrective action for welding station 14 while allowing it to continue to operate.

Although an embodiment of the invention and its advantages are described in detail, a person skilled in the art could make various alterations, additions, and omissions with departing from the spirit and scope of the present invention as defined by the appended claims.

What is claimed is:

1. A system for testing a clamping force, comprising:
   a lever coupled to a pivot and operable to move about the pivot, the lever comprising a first end and a second end on opposites sides of the pivot;
   a base operable to receive a first tip of a clamp and to maintain a fixed position relative to the pivot, wherein the second end of the lever is operable to receive a second tip of the clamp and to move relative to the base and the pivot as the first tip and the second tip of the clamp move towards one another; and
   a sensor operable to measure a first force applied by the first end of the lever, wherein the first force is proportional to a second force applied to the second end of the lever by the clamp.

2. The system of claim 1, wherein the sensor is a load cell operable to measure the first force applied by the first end of the lever pushing against the load cell.

3. The system of claim 1, wherein the sensor is strain gauge operable to measure the first force applied by the first end of the lever pulling away from the strain gauge.

4. The system of claim 1, wherein the pivot is substantially midway between a first contact point where the first end of the lever is coupled to the sensor and a second contact point where the second end of the lever receives the second tip of the clamp.

5. The system of claim 1, wherein the pivot is located nearer to a first contact point where the first end of the lever is coupled to the sensor than to a second contact point where the second end of the lever receives the second tip of the clamp.

6. The system of claim 1, wherein the pivot is located further from a first contact point where the first end of the lever is coupled to the sensor than from a second contact point where the second end of the lever receives the second tip of the clamp.

7. The system of claim 1, further comprising a processor operable to receive a measurement of the first force from the sensor and to calculate the second force applied to the second end of the lever by the clamp.

8. The system of claim 1, further comprising a processor operable to receive a measurement of the first force from the sensor and to determine whether the measurement falls within an acceptable range, the processor further operable to trigger an event in response to determining that the measurement falls outside the acceptable range.

9. The system of claim 8, wherein the event comprises generating an automatic notice that the measurement falls outside the acceptable range.

10. The system of claim 8, wherein the event comprise disabling the clamp.

11. A method of testing a clamping force, comprising:
receiving a first tip of a clamp at a base that is operable to maintain a fixed position relative to a pivot of a lever, the lever comprising a first end and a second end on opposite sides of the pivot;
receiving a second tip of a clamp at the second end of the lever; and
measuring a force at the first end of the lever, wherein the measured force at the first end of the lever is proportional to a clamping force applied to the second end of the lever by the clamp.

12. The method of claim 11, wherein measuring the force at the first end of the lever further comprises using a load cell to measure the force applied by the first end of the lever pushing against the load cell.

13. The method of claim 11, wherein measuring the force at the first end of the lever further comprises using a strain gauge to measure the force applied by the first end of the lever pulling away from the strain gauge.

14. The method of claim 11, wherein the pivot of the lever is substantially midway between a first contact point where the first end of the lever is coupled to a sensor for measuring the force at the first end of the lever and a second contact point where the second end of the lever receives the second tip of the clamp.

15. The method of claim 11, wherein the pivot of the lever is located nearer to a first contact point where the first end of the lever is coupled to a sensor for measuring the force at the first end of the lever than to a second contact point where the second end of the lever receives the second tip of the clamp.

16. The method of claim 11, wherein the pivot of the lever is located further from a first contact point where the first end of the lever is coupled to a sensor for measuring the force at the first end of the lever than from a second contact point where the second end of the lever receives the second tip of the clamp.

17. The method of claim 11, further comprising calculating the clamping force applied to the second end of the lever by the clamp using the measurement of the force at the first end of the lever.

18. The method of claim 11, further comprising:
determining whether the measurement of the force at the first end of the lever falls within an acceptable range; and
triggering an event in response to determining that the measurement falls outside the acceptable range.

19. The method of claim 18, wherein the event comprises generating an automatic notice that the measurement falls outside the acceptable range.

20. The method of claim 18, wherein the event comprise disabling the clamp.

\* \* \* \* \*